(12) United States Patent
Todd et al.

(10) Patent No.: US 10,922,304 B1
(45) Date of Patent: Feb. 16, 2021

(54) DISTRIBUTED DATA PROTECTION MANAGEMENT IN MULTI-CLOUD COMPUTING ENVIRONMENT

(71) Applicant: EMC IP Holding Company LLC, Hopkinton, MA (US)

(72) Inventors: Stephen Todd, Shrewsbury, MA (US); Kenneth Durazzo, San Jose, CA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 409 days.

(21) Appl. No.: 15/789,263

(22) Filed: Oct. 20, 2017

(51) Int. Cl.
*G06F 16/23* (2019.01)
*G06F 11/14* (2006.01)
*G06F 16/951* (2019.01)

(52) U.S. Cl.
CPC ...... *G06F 16/2365* (2019.01); *G06F 11/1464* (2013.01); *G06F 16/951* (2019.01); *G06F 2201/80* (2013.01)

(58) Field of Classification Search
CPC .............. G06F 16/2365; G06F 16/951; G06F 11/1464; G06F 2201/80
See application file for complete search history.

(56) References Cited

U.S. PATENT DOCUMENTS

| | | | | |
|---|---|---|---|---|
| 2015/0379529 | A1* | 12/2015 | Batrakov | G06Q 30/0201 705/7.29 |
| 2017/0228371 | A1* | 8/2017 | Seger, II | G06F 16/215 |
| 2017/0264428 | A1* | 9/2017 | Seger, II | H04L 9/0637 |
| 2018/0089041 | A1* | 3/2018 | Smith | G06Q 20/00 |
| 2018/0227118 | A1* | 8/2018 | Bibera | G06Q 40/04 |
| 2018/0268401 | A1* | 9/2018 | Ortiz | G06Q 20/204 |
| 2018/0294956 | A1* | 10/2018 | O'Brien | H04L 9/0637 |
| 2019/0102409 | A1* | 4/2019 | Shi | G06F 16/2379 |

OTHER PUBLICATIONS

U.S. Appl. No. 15/730,990 filed in the name of Stephen Todd et al., filed Oct. 12, 2017 and entitled Data Management for Extended Multi-Cloud Environment.
U.S. Appl. No. 15/136,327 filed in the name of Stephen Todd et al., filed Apr. 22, 2016 and entitled "Calculating Data Value Via Data Protection Analytics."
S. Nakamoto, "Bitcoin: A Peer to Peer Electronic Cash System," White Paper, http://bitcoin.org/bitcoin.pdf, Nov. 2008, 9 pages.

* cited by examiner

*Primary Examiner* — Tony Mahmoudi
*Assistant Examiner* — Umar Mian
(74) *Attorney, Agent, or Firm* — Ryan, Mason & Lewis, LLP

(57) ABSTRACT

In a cloud computing environment associated with an enterprise comprising one or more cloud platforms with one or more respective data protection ecosystems, a method maintains a distributed ledger system with a plurality of nodes, wherein a given one of the data protection ecosystems is operatively coupled to a given one of the plurality of nodes of the distributed ledger system. Further, the method manages one or more data sets processed by the one or more data protection ecosystems in association with the distributed ledger system, wherein managing comprises storing transaction data associated with the processing of the one or more data sets on the distributed ledger system to enable an environment-wide view of the stored transaction data.

20 Claims, 7 Drawing Sheets

200

400

600

DISTRIBUTED DATA PROTECTION MANAGEMENT IN MULTI-CLOUD COMPUTING ENVIRONMENT

FIELD

The field relates generally to networks of computing resources, and more particularly to techniques for management of data protection and data deletion events in such networks of computing resources.

BACKGROUND

Enterprises such as corporations typically utilize a cloud computing environment to manage their computing resources and data. One or more cloud platforms that are part of this environment may be within the exclusive control and management of the enterprise, and therefore are considered "private clouds." On the other hand, the cloud computing environment can include one or more cloud platforms that can be used by multiple enterprises, and not necessarily controlled or managed by any of the multiple enterprises but rather are controlled and managed by one or more third-party cloud providers. Such cloud platforms are typically considered "public clouds." More typically, enterprises may choose to host their applications, services and data on a combination of private and public clouds that form a multi-cloud computing environment. As such, a vast array of computing resources may be attached to or otherwise a part of such a multi-cloud computing environment (e.g., employee computing devices, customer computing devices, etc.).

Centralized data management in such multi-cloud computing environments has been the norm for many decades. However, with increased decentralization of such environments, e.g., due to the proliferation of additional computing resources such as edge servers, gateways, and endpoint devices such as Internet of Things (IoT) devices now being part of the environment, centralized data management has become much more difficult, if not impossible.

Still further, to add to the data management difficulties of an enterprise, data protection ecosystems create multiple copies of data (e.g., backups, snapshots, etc.) throughout such a multi-cloud computing environment rendering any centralized data management approaches highly ineffective.

SUMMARY

Embodiments of the invention provide systems and methods for distributed data protection management in a multi-cloud computing environment.

For example, in one embodiment, a method comprises the following steps. In a cloud computing environment associated with an enterprise comprising one or more cloud platforms with one or more respective data protection ecosystems, the method maintains a distributed ledger system with a plurality of nodes, wherein a given one of the data protection ecosystems is operatively coupled to a given one of the plurality of nodes of the distributed ledger system. Further, the method manages one or more data sets processed by the one or more data protection ecosystems in association with the distributed ledger system, wherein managing comprises storing transaction data associated with the processing of the one or more data sets on the distributed ledger system to enable an environment-wide view of the stored transaction data.

Advantageously, illustrative embodiments utilize distributed data protection management techniques in a multi-cloud computing environment to overcome drawbacks associated with existing data protection management approaches.

These and other features and advantages of the invention will become more readily apparent from the accompanying drawings and the following detailed description.

DETAILED DESCRIPTION

Illustrative embodiments will be described herein with reference to exemplary information processing systems and associated host devices, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual computing resources. An information processing system may therefore comprise, for example, a cloud infrastructure hosting multiple tenants that share cloud computing resources. Such systems are considered examples of what are more generally referred to herein as cloud computing environments. Environments that implement multiple cloud platforms are referred to as multi-cloud computing environments. As mentioned above, a multi-cloud computing environment employed by an enterprise may comprise a combination of one or more private clouds and one or more public clouds. The term "enterprise" as used herein is intended to be broadly construed, and may comprise, for example, one or more businesses, one or more corporations or any other one or more entities, groups, or organizations. An "entity" as illustratively used herein may be a person or system.

Illustrative embodiments provide techniques for distributed management of data associated with data protection ecosystems of a multi-cloud computing environment. The multi-cloud computing environment may include a wide variety of computing resources that form an information processing system. The term "computing resource," as illustratively used herein, can refer to any device, endpoint, component, element, platform, cloud, data center, storage array, client, server, gateway, or other resource, that is part of a multi-cloud computing environment associated with an enterprise. An example of a multi-cloud computing environment associated with an enterprise is shown in FIG. 1.

Figure 1:
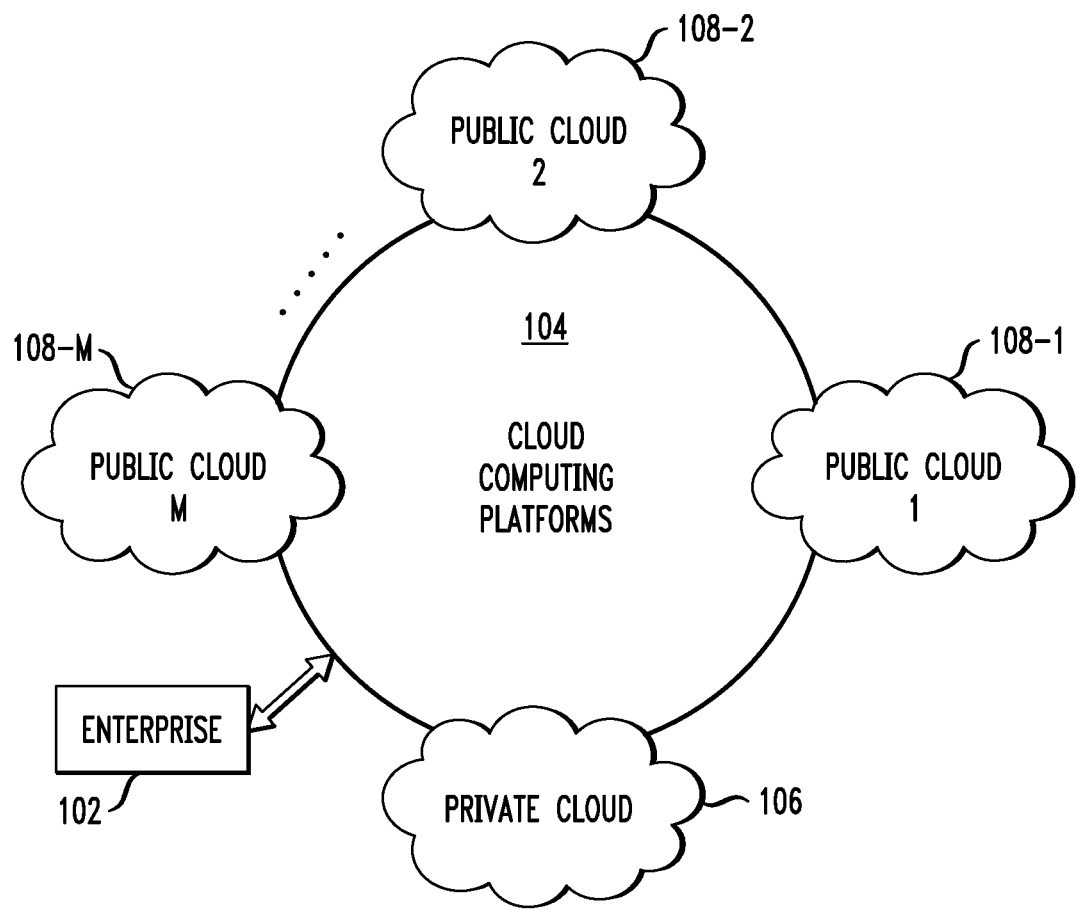
FIG. 1 illustrates a multi-cloud computing environment associated with an enterprise with which one or more illustrative embodiments may be implemented.

As shown in FIG. 1, multi-cloud computing environment 100 comprises an enterprise 102 and a set of cloud computing platforms 104 upon which the enterprise 102 hosts its application programs and data assets. The set of cloud computing platforms 104 comprises a private cloud 106 and a plurality of public clouds 108-1, 108-2, ..., 108-M. It is to be appreciated, however, that there can be more than one private cloud in the multi-cloud computing environment 100. Still further, the environment 100 can alternatively be composed of only private clouds or only public clouds. Note that specific cloud infrastructure may be purpose-built to serve as a destination for cloud native applications while some may be purpose-built for traditional applications. Examples of public clouds may include, but are not limited to, Amazon Web Services® (AWS), Google Compute Engine® (GCE), and Windows Azure® Services platforms.

There has been a proposal to provide decentralized management of data in multi-cloud computing environments that tracks the creation of data, the type of data being created, where data is being created, the deletion of data, and the value of data. For example, such a system is described in U.S. patent application Ser. No. 15/730,990, entitled "Data Management for Extended Multi-Cloud Environment" filed Oct. 12, 2017, the disclosure of which is incorporated by reference herein in its entirety. Such system gives visibility into content creation, value, and deletion throughout at the furthest edges of an extended multi-cloud computing environment (e.g. edge servers, gateways, endpoints, etc.). For example, if new content is deleted on a gateway device before ever being migrated to the cloud, a record of the creation, metadata, and deletion would be available for later scrutiny.

However, the above-mentioned tracking technique does not necessarily facilitate the actual management of data generated in accordance with a data protection ecosystem, and eventual deletion of data protection copies that may have proliferated across a multi-cloud computing environment. The term "data protection ecosystem" illustratively refers to a system (e.g., comprising devices, subsystems, tools, algorithms, policies, schedules, mappings, catalogs, backup data, etc.) that protects data. By way of example, the data that is being protected may be part of a "production environment" or "primary storage environment," i.e., a data storage environment where data is accessible online by one or more clients such as a private cloud (e.g., 106 in FIG. 1) or a public cloud (e.g., one of public clouds 108-1, 108-2, ..., 108-M in FIG. 1). Backup data, metadata, and analytics results are obtained during the course of the data protection ecosystem providing data backup and recovery functionalities for the primary storage environment.

Some of the challenges associated with data copy management across a multi-cloud computing environment (e.g., 100 in FIG. 1) are highlighted below in the context of FIG. 2.

Figure 2:
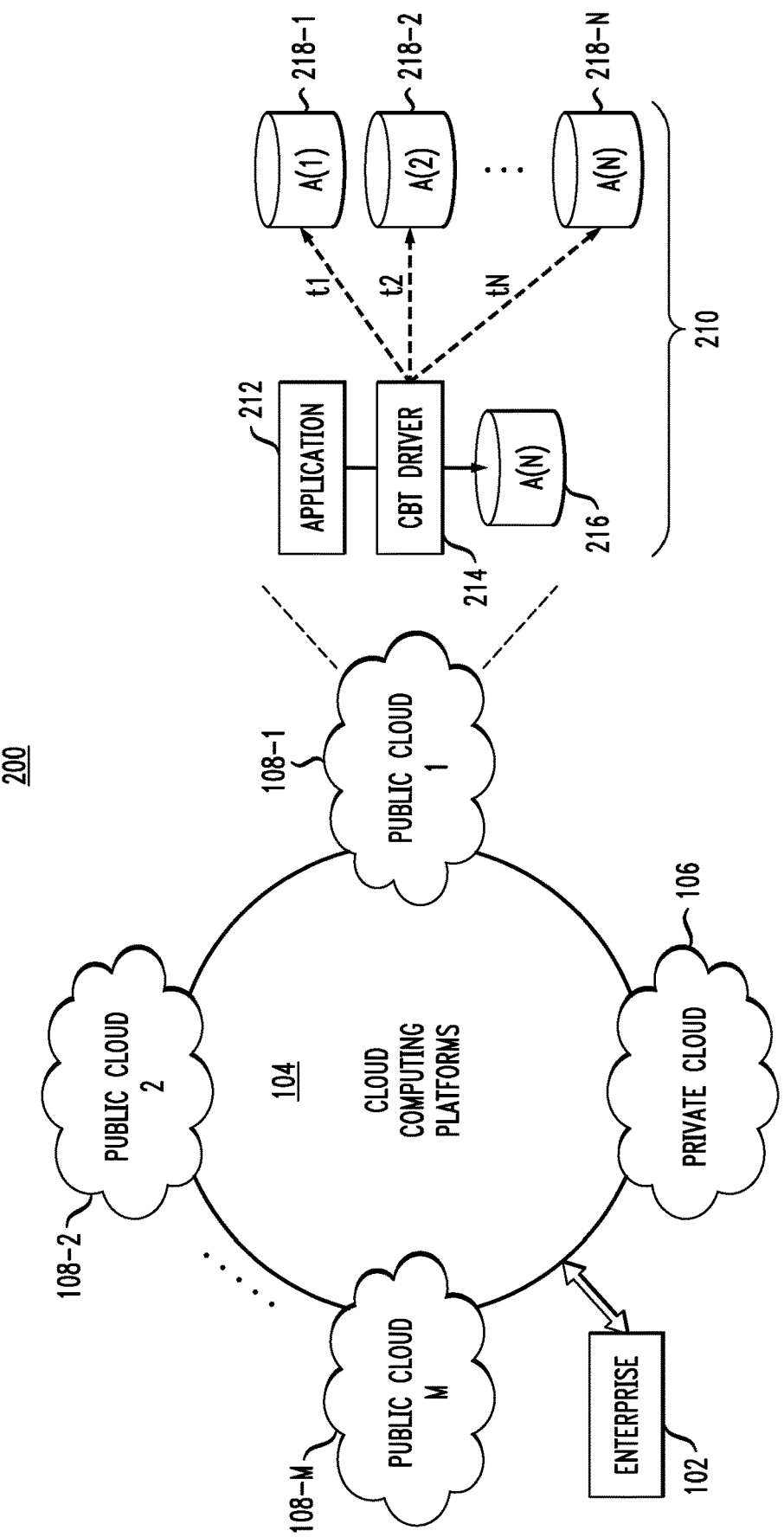
FIG. 2 illustrates the multi-cloud computing environment of FIG. 1 with an example of a data protection ecosystem associated with at least one of the cloud platforms with which one or more illustrative embodiments may be implemented.

FIG. 2 illustrates a multi-cloud computing environment 200 with the set of cloud platforms 104 (FIG. 1) and a data protection ecosystem 210 associated with one of the cloud platforms, i.e., public cloud 108-1. More particularly, FIG. 2 depicts an application workload 212 that has been assigned to execute on computing resources of public cloud 108-1. It is assumed that this application workload 212 is also executing a data protection algorithm 214 that utilizes changed block tracking (CBT). A CBT data protection algorithm operates on a block storage device and indicates the blocks in the device that have changed since the last backup operation. Thus, in FIG. 2, it is assumed that the data protection ecosystem 210 utilizes CBT and backs up a primary data set 216 (A(N)) as data set copies 218-1, 218-2, ..., 218-N at different time instances (A(1), A(2), ..., A(N), where N is time t1, time t2, ... etc.).

It should be understood that CBT is exemplary and any data protection mechanism can be used. CBT will typically be used when trying to move snapshots or snaps (data set copies) across clouds. However, in other cloud platforms, native snapshots and internal mechanism may be used to efficiently create copies. However, the point to be appreciated is that the data protection scenario depicted in FIG. 2 with respect to public cloud 108-1 can occur across every cloud platform within the multi-cloud computing environment. This leads to several challenges, examples of which are described below.

Deletion of content. Assume an enterprise whose data is stored in a given single cloud platform wishes to delete the primary data set (e.g., data set 216 in FIG. 2). However, deletion of the primary data set may still leave behind copies (e.g., data set copies 218-1, 218-2, ..., 218-N). These copies may represent wasted cost and/or present risk, as will be further explained below, to an organization.

Deletion of cross-cloud protected content. This problem is similar to the above-mentioned single cloud platform problem but, in this case, assume that a primary data set is stored on one cloud platform and data set copies of the primary data set are stored on another cloud platform. In such case, copies stored on a separate cloud may be even more difficult to track in the case of deletion. This can result in excessive costs and/or increased risk.

Movement of workloads/content. Assume that a data set is targeted for migration from one cloud platform to another cloud platform. It is realized herein that the migration tool may be unaware of the number of copies and level of protection required by the content. This can result in a number of problems including, but not limited to: (i) leaving content under-protected in its new environment; or (ii) once again leaving copies unattended or forgotten in the legacy cloud platform.

Inaccurate multi-cloud valuation of individual data sets. The value of any given data set to an organization can be contributed to a multi-cloud distributed ledger in order to yield a cross-cloud view into the value of distributed corporate data assets. Without a view into the number of protection copies, however, the value will be inaccurate. The cost of copy management may ultimately subtract from the overall value, or the number of copies may be an indicator of a higher value than calculated.

Inability to calculate value via data protection ecosystem. The value of a given data set can be calculated in any number of ways. One of the more powerful mechanisms is to analyze any metadata kept by the data protection ecosystem (e.g., backup schedules, number of copies, authorized users, etc.). In existing approaches, the locations of the data protection ecosystems across multiple clouds is unknown and non-coordinated. This leaves a gap in the ability to fully value data assets using all available methods. By way of example only, see U.S. patent application Ser. No. 15/136, 327, entitled "Calculating Data Value Via Data Protection Analytics" filed Apr. 22, 2016, the disclosure of which is incorporated by reference herein in its entirety, which describes techniques for leveraging a data protection ecosystem to calculate the value of data.

Lack of multi-cloud deletion auditability. In a private cloud setting, an enterprise may have full control over copy management and may also have the ability to log the deletion of data and corresponding copies. This log data can be supplied as a proof point during audit exercises. In an existing multi-cloud environment with public cloud platforms, this auditability is much more problematic as the deletion logs: (i) may not include copies; or (ii) may not be in the same format and/or easily collectable.

Multi-cloud copy identification during expiration. Certain documents within an enterprise have retention periods that expire at regular intervals. These expiration events often trigger deletions once the period of retention has elapsed. The enterprise may wish to remove all copies of the data for a variety of purposes (e.g., cost savings, and/or regulations/policies that require the absolute removal of the content). There is currently no multi-cloud mechanism to list where all of those copies exist as well as no audit log that proves the content and all copies were removed.

Dashboard visibility into cross-cloud protection operations. Data protection within specific clouds may result in modifications to backup schedules, restore operations, analytic jobs against protection copies, etc. These activities, when they occur in multiple clouds, cannot be tracked and monitored through a central dashboard in existing systems. The lack of visibility can result in security issues when backups are being destroyed, examined, or altered maliciously or accidentally.

Illustrative embodiments overcome the above and other drawbacks associated with existing data management approaches and systems. More particularly, illustrative embodiments provide systems and methods for distributed data protection management in a multi-cloud computing environment. In one exemplary embodiment, cloud-local data protection ecosystems are modified to function with a distributed ledger system such as a blockchain.

As used herein, the terms "blockchain," "digital ledger" and "blockchain digital ledger" may be used interchangeably. As is known, the blockchain or digital ledger protocol is implemented via a distributed, decentralized computer network of compute nodes (e.g., blockchain nodes or BCNs). The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction(s) and a hash value of the previous block in the chain, i.e., the previous transaction. That is, each block is typically a group of transactions. Thus, advantageously, each data block in the blockchain represents a given set of transaction data plus a set of all previous transaction data.

In the case of a "bitcoin" implementation of a blockchain distributed ledger, the blockchain contains a record of all previous transactions that have occurred in the bitcoin network. The bitcoin system was first described in S. Nakamoto, "Bitcoin: A Peer to Peer Electronic Cash System," 2008, the disclosure of which is incorporated by reference herein in its entirety.

A key principle of the blockchain is that it is trusted. That is, it is critical to know that data in the blockchain has not been tampered with by any of the compute nodes in the computer network (or any other node or party). For this reason, a cryptographic hash function is used. While such a hash function is relatively easy to compute for a large data set, each resulting hash value is unique such that if one item of data in the blockchain is altered, the hash value changes. However, it is realized that given the constant generation of new transactions and the need for large scale computation of hash values to add the new transactions to the blockchain, the blockchain protocol rewards compute nodes that provide the computational service of calculating a new hash value. In the case of a Bitcoin network, a predetermined number of bitcoins are awarded for a predetermined amount of computation. The compute nodes thus compete for bitcoins by performing computations to generate a hash value that satisfies the blockchain protocol. Such compute nodes are referred to as "miners." Performance of the computation of a hash value that satisfies the blockchain protocol is called "proof of work." While bitcoins are one type of reward, blockchain protocols can award other measures of value (monetary or otherwise) to successful miners.

It is to be appreciated that the above description represents an illustrative implementation of the blockchain protocol and that embodiments of the invention are not limited to the above or any particular blockchain protocol implementation. As such, other appropriate processes may be used to securely maintain and add to a set of data in accordance with embodiments of the invention. For example, distributed ledgers such as, but not limited to, R3 Corda, Ethereum, MultiChain, and Hyperledger may be employed in alternative embodiments.

Figure 3:
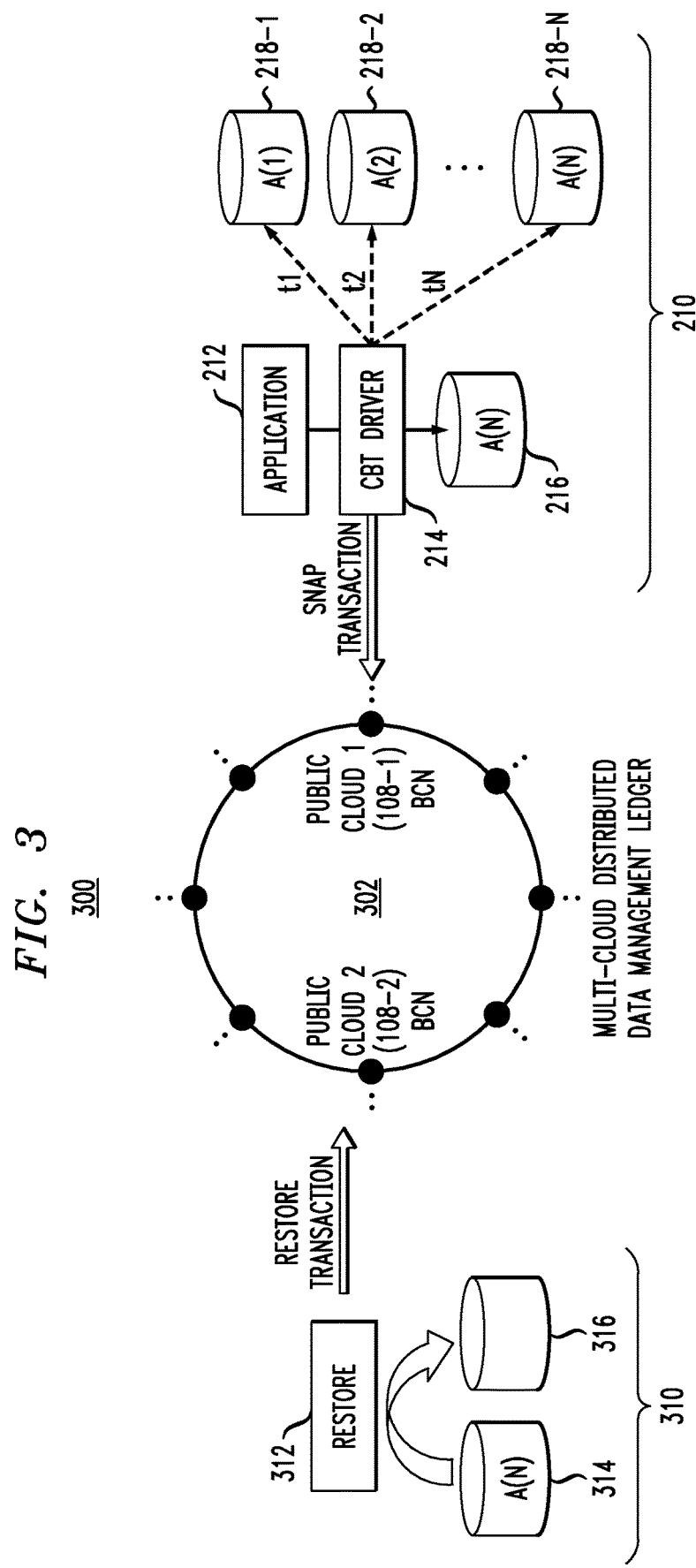
FIG. 3 illustrates at least part of a distributed data management ledger for managing data associated with data protection ecosystems of a multi-cloud computing environment, according to an illustrative embodiment.

FIG. 3 illustrates a distributed ledger system for managing data copies associated with a multi-cloud computing environment 300, according to an illustrative embodiment. As generally illustrated, a plurality of blockchain nodes are operatively coupled to form a multi-cloud distributed data management ledger system 302. A given blockchain node or BCN in the ledger system serves as a local BCN for a given one of the cloud platforms that comprise the multi-cloud computing environment. Thus, as illustratively shown in the distributed ledger system 302 in FIG. 3, respective BCNs (dark circles along the ring representing the ledger) are part of the ledger system for Public Cloud 1 (108-1 in FIG. 1) and Public Cloud 2 (108-2 in FIG. 1), as well as other cloud platforms in the multi-could computing environment.

As contemplated in illustrative embodiments, each data protection ecosystem associated with each cloud platform is configured to store one or more transactions on the distributed ledger of system 302 at a corresponding local BCN such that the one or more transactions are immutably stored on the distributed ledger and securely accessible by the plurality of BCNs in the ledger system. As shown, Public Cloud 1 has a data protection ecosystem 210 (as described above in the context of FIG. 2) which stores as transaction data, on its local BCN, metadata about its data protection operations (e.g., "snap transactions" associated with CBT snapshots or data copies). Similarly, Public Cloud 2 has a data protection ecosystem 310 illustrated as a restore operation 312 whereby a data set copy 314, A(2), is used to restore a primary data set 316. The data protection ecosystem 310 for Public Cloud 2 stores as transaction data, on its local BCN, metadata about its data protection operations (e.g., "restore transactions"). Transaction data may include, but is not limited to, metadata about one or more copied data sets, metadata about one or more restored data sets, metadata about one or more deleted data sets, other metadata that would be useful for an enterprise to know about data being processed by a given data protection ecosystem in the multi-cloud computing environment 300. As used herein, "metadata" is generally understood to refer to any data that describes, defines or otherwise characterizes other data. Advantageously, in accordance with illustrative embodiments, individual data protection ecosystems within a given cloud now have a gateway blockchain node into which they can record data protection transactions.

Many beneficial processes and mechanisms flow from such a multi-cloud distributed data management ledger system 302 shown in FIG. 3. Examples of such processes and mechanisms will now be further described.

Establishment of a cloud-local data management blockchain portal. In one or more illustrative embodiments, within each cloud platform (e.g., 106, 108-1, 108-2, . . . , 108-M), a local BCN and portal is introduced that is specifically responsible for data management/protection operations. This local node can be implemented using any common blockchain technology (e.g., as mentioned above, Hyperledger, Ethereum, MultiChain, etc.).

Integration of local data protection components with the blockchain portal. In one or more illustrative embodiments, the port number of the blockchain portal is presented to the local data protection ecosystem such that the data protection ecosystem can forward data to the portal. This can be accomplished in any number of ways, whether it be forwarding raw log events to the portal, to modification of the data protection ecosystem to specifically send ready-made blockchain transactions to the portal.

Figure 4:
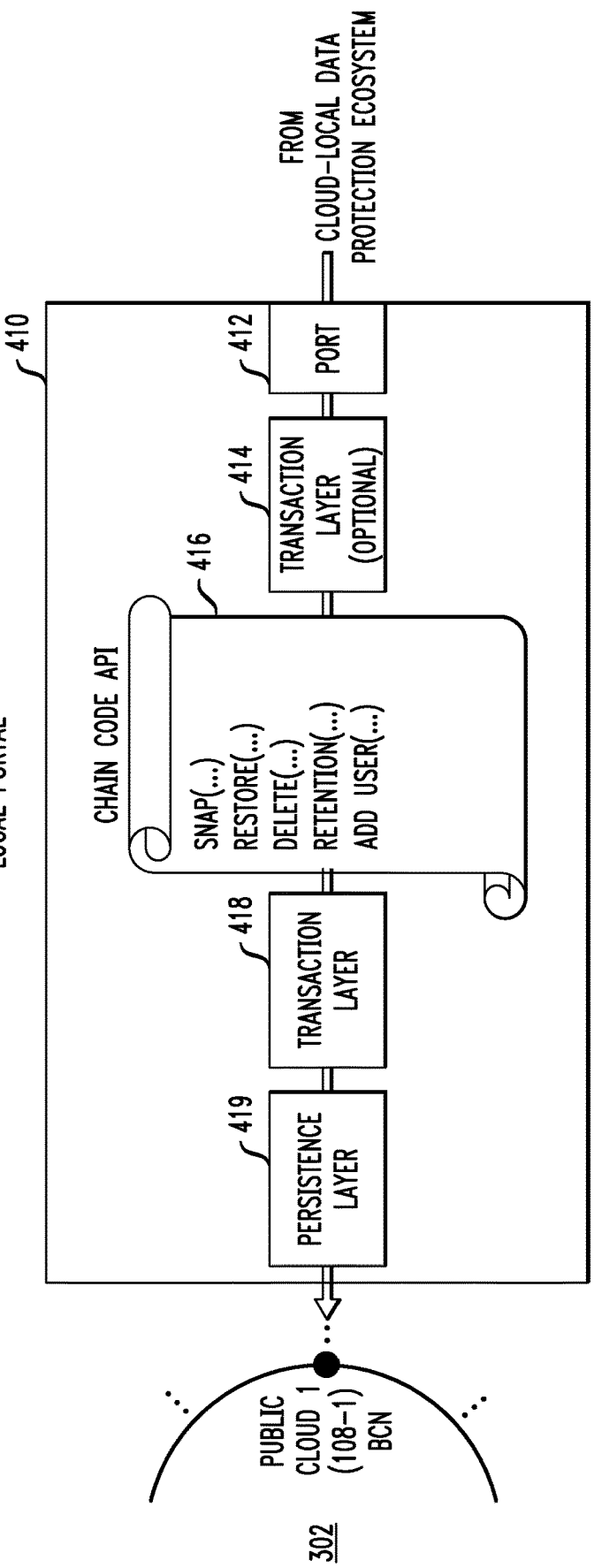
FIG. 4 illustrates a local portal associated with a data protection ecosystem of a multi-cloud computing environment, according to an illustrative embodiment.

Data protection/management smart contracts implemented within the portal. In one or more illustrative embodiments, a smart contract is implemented within the blockchain portal. As is known, a smart contract is a computer protocol typically implemented in a blockchain system, that facilitates negotiation and/or verifies performance of a set of requirements. In one embodiment, the smart contract is an application programming interface (API) that advertises data management/protection operations and records those operations onto the multi-cloud distributed data management ledger of system 302 shown in FIG. 3. FIG. 4 provides an example of a smart contract in the form of a Hyperledger Chaincode API file.

More particularly, as shown in example 400 in FIG. 4, a local blockchain portal 410 (e.g., corresponding to Public Cloud 1 (108-1) BCN) receives an event from the cloud-local data protection ecosystem at its port 412. An optional translation layer 414 may take raw data coming from a native system (e.g., networker logs) and translate the raw data into data management APIs such as ChainCode API 416. ChainCode is a Hyperledger smart contract concept. This particular chain code (program file or, more generally, logic) is responsible for converting data management events into blockchain transactions. The logic defines standardized formats (requirements) to which the data associated with the given event (e.g., snap, restore, delete, retention, add user) received from the data protection ecosystem is to be converted for storage on the blockchain at the local node of the distributed ledger system. The term "optional" with respect to the translation layer 414 means that if the local portal 410 does not have such a translation function, the raw log data can be provided to the BCN which performs the translation function. Transaction layer 418 creates "transaction packets" from the formatted data. Persistence layer 419 stores the transaction packets (transaction data) to the local ledger (stored at its corresponding local BCN) and then the local portal 410 forwards the transaction packets to other peers (other BCNs) within the multi-cloud distributed data management ledger system 302.

Figure 5:
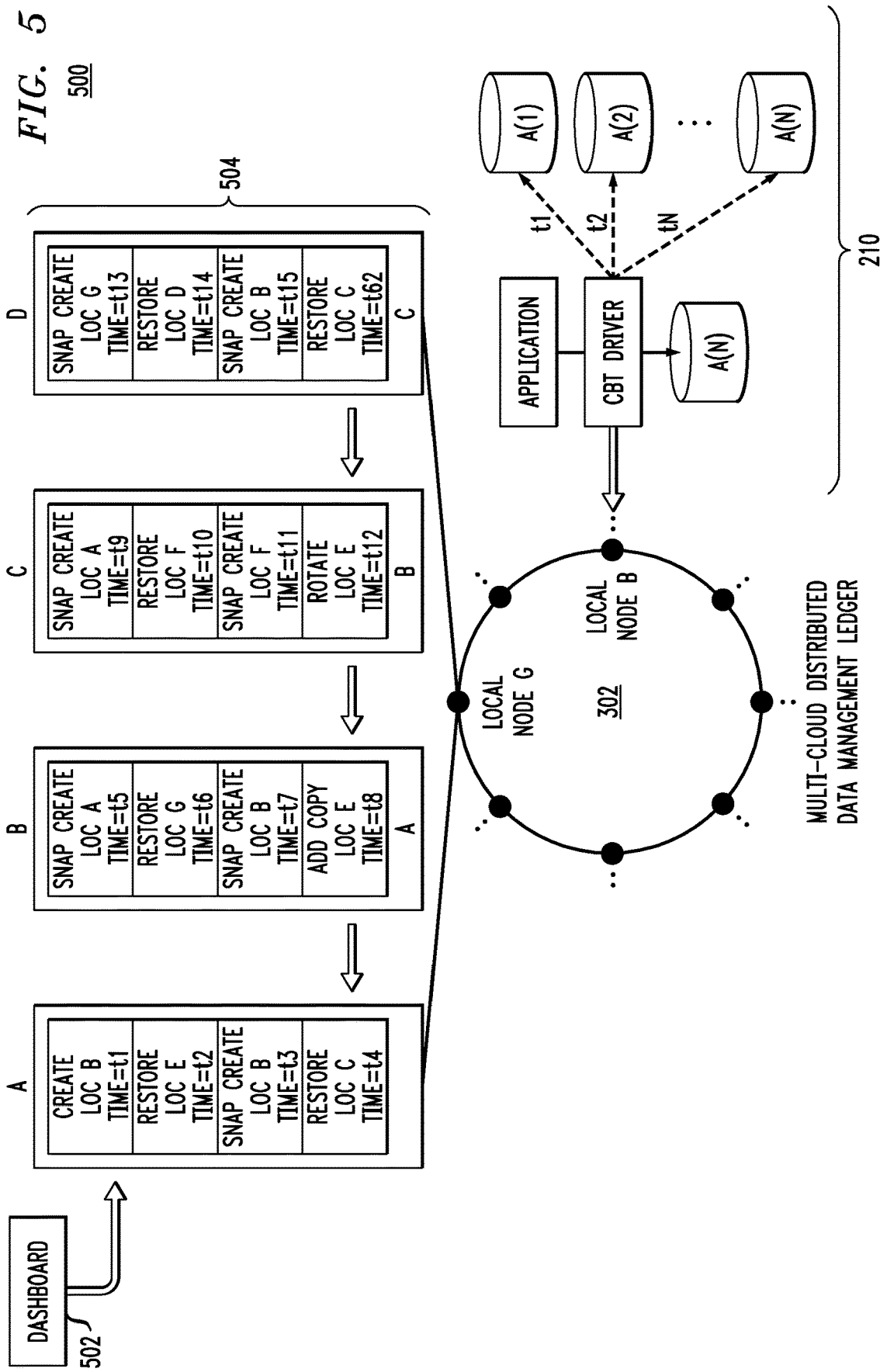
FIG. 5 illustrates a multi-cloud dashboard for managing data associated with data protection ecosystems of a multi-cloud computing environment, according to an illustrative embodiment.

Dashboard view of multi-cloud data management operations. Each node (BCN) within a blockchain system (e.g., system 302) contains a full copy of the entire ledger. FIG. 5 illustrates how a distributed ledger can be navigated by a dashboard 502 to obtain and present a view 504 of data management/protection activities (events) across a multi-cloud computing environment.

Every data management transaction is entered into the blockchain via the local node. For example, as shown in example 500 in FIG. 5, data protection ecosystem 210 enters transaction data to its local BCN (local node B). These transactions are grouped into "blocks" (A, B, C, D) and the most recent block (D in this example) points back to the last block in the chain (e.g. block "C"). Note that the letter at the bottom of each block refers to the previous block, and block A is called the genesis block since it is the first block created.

Figure 6:
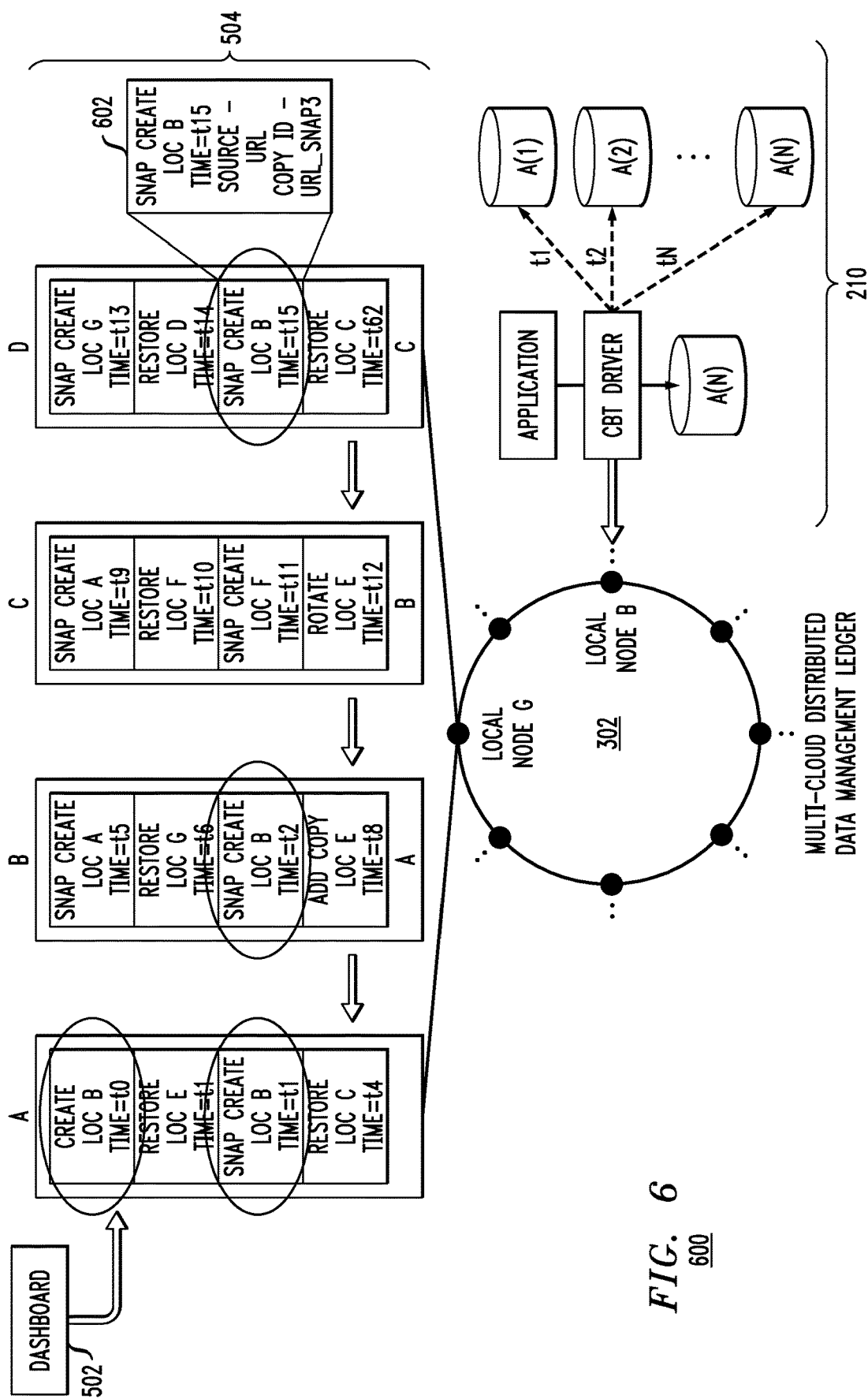
FIG. 6 illustrates an example of locating data copies associated with data protection ecosystems of a multi-cloud computing environment using the multi-cloud dashboard of FIG. 5, according to an illustrative embodiment.

Ability to locate all copies across multiple clouds. FIG. 6 illustrates in example 600 (which builds on example 500) that on a public cloud associated with local node B, a production volume "A(N)" is currently being accessed by an application, and a CBT driver occasionally "snaps" this volume to create copies. FIG. 6 illustrates the specific blockchain transactions which show the original creation event of A(N) (circled as a "create" transaction in block A) and all subsequent copies (circled as "snap create" transactions in blocks A, B and D) made of that volume. An expanded view of the transaction at t=15 (labeled 602) is also shown to highlight the type of information that can be added to the blockchain transaction. Thus, view 504 is presented to a user (e.g., enterprise administrator, data analyst, etc.) through dashboard 502. Note that, in one or more illustrative embodiments, the original data set creation/capture event is stored on the ledger system as well as the data protection events (as depicted in the examples 500 and 600 in FIGS. 5 and 6). Thus, both creation/capture events and data protection events are stored on the ledger system.

Assuming that production copy "A(N)" has a universal identifier (e.g., some sort of unique uniform resource locator or URL), and that a naming scheme has been created that appends to this unique URL (e.g., URL.Snap1, URL.Snap2, URL.Snap3), dashboard 502 (with a query engine built therein) can find all associated copies. The copy and original creation events can be highlighted in the dashboard view by circling them (as illustrated in FIG. 6) or by some other query response presentation method. Consider a "find_all_copies" command line instruction (CLI) that accepts a blockchain handle and a data URL and receives the following list:

FIND_ALL_COPIES (Blockchain, URL);
Output:
  Node B:
    URL (Created t0)
    URL.Snap1 (Created t1)
    URL.Snap1 (Created t2)
    URL.Snap15 (Created t15)

Ability to delete/move all copies across multiple clouds. Now that illustrative embodiments provide a mechanism to track data management/protection operations, the "list" of all copies is known and can be used as input into move and/or delete operations. The delete or move operation, when executed through the dashboard 502, is likewise inserted into the data management blockchain (of ledger system 302) and can be used for audit purposes as well.

Given the view 504 through dashboard 502 (note that the view 504 is only one example of a visualization that can be accessed through dashboard 502), the enterprise is able to ascertain how many primary and protection copies there are across the multi-cloud computing environment, as well as see them being created. Thus, when a primary data set is moved somewhere else in the multi-cloud computing environment, all copies can be moved as well. The same thing is true for deletion operations, i.e., all data set copies of a primary data set can be deleted when the primary data set is deleted. In addition, the accurate count of copies within the multi-cloud computing environment can be used to calculate a more accurate value for a given data set. The enterprise can therefore log the movement, the valuation, and the deletion into the same blockchain (e.g., ledger 302) if desired for audit purposes.

It is to be appreciated that the dashboard 502 can be implemented on one or more of the BCNs, one or more computing devices of the enterprise (102) coupled to the distributed ledger system, one or more dedicated computing devices coupled to the system, or some combination thereof.

Figure 7:
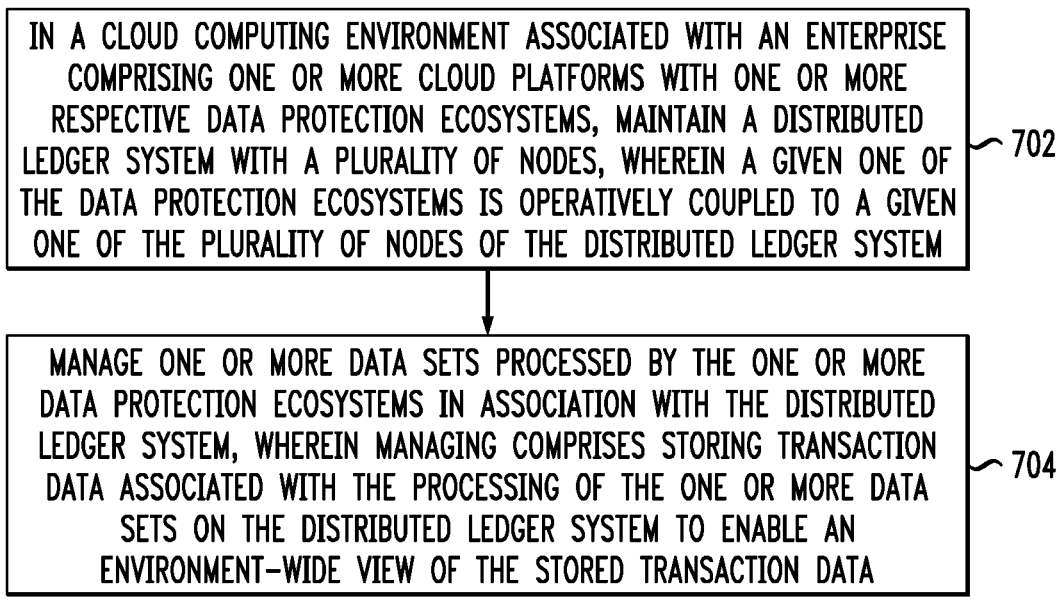
FIG. 7 illustrates a methodology for distributed management of data associated with data protection ecosystems of a multi-cloud computing environment, according to illustrative embodiments.

Given the illustrative description of distributed data protection management techniques herein, FIG. 7 depicts a methodology for distributed management of data associated with data protection ecosystems of a multi-cloud computing environment, according to illustrative embodiments.

In FIG. 7, methodology 700 comprises the following steps. In a cloud computing environment associated with an enterprise comprising one or more cloud platforms with one or more respective data protection ecosystems, step 702 maintains a distributed ledger system with a plurality of nodes, wherein a given one of the data protection ecosystems is operatively coupled to a given one of the plurality of nodes of the distributed ledger system. Further, step 704 manages one or more data sets processed by the one or more data protection ecosystems in association with the distributed ledger system, wherein managing comprises storing transaction data associated with the processing of the one or more data sets on the distributed ledger system to enable an environment-wide view of the stored transaction data.

It is to be appreciated that while illustrative embodiments describe distributed data management from the perspective of a multi-cloud environment, the distributed data management techniques also apply generally to a "cloud computing environment" where there is a single cloud platform implementation.

At least portions of the distributed data management ledger for managing data associated with data protection ecosystems of a multi-cloud computing environment shown in FIGS. 1-7 may be implemented using one or more processing platforms associated with one or more information processing systems. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 8.

As is apparent from the above, one or more of the processing modules or other components of the distributed data management ledger for managing data associated with data protection ecosystems of a multi-cloud computing environment shown in FIGS. 1-7 may each run on a computer, server, storage device or other processing platform element. A given such element may be viewed as an example of what is more generally referred to herein as a "processing device." An example of such a processing platform is processing platform 800 shown in FIG. 8.

The processing platform 800 in this embodiment comprises a plurality of processing devices, denoted 802-1, 802-2, 802-3, . . . 802-N, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Figure 8:
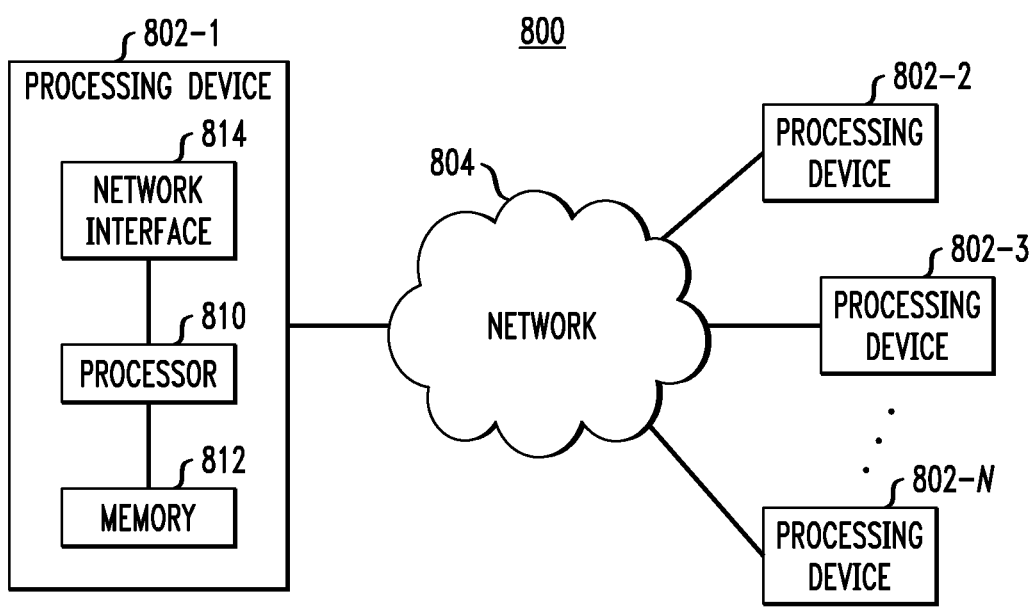
FIG. 8 illustrates a processing platform used to implement a system for distributed management of data associated with data protection ecosystems of a multi-cloud computing environment, according to an illustrative embodiment.

Also included in the processing device 802-1 of the example embodiment of FIG. 8 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the distributed data management ledger for managing data associated with data protection ecosystems of a multi-cloud computing environment. Such components can communicate with other elements of the system over any type of network or other communication media.

As indicated previously, in some embodiments, components of the distributed data management ledger for managing data associated with data protection ecosystems of a multi-cloud computing environment as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method comprising:
   in a multi-cloud computing environment associated with an enterprise comprising two or more cloud platforms with one or more respective data protection ecosystems, maintaining a distributed ledger system comprising a plurality of nodes operatively coupled in a peer-to-peer communications protocol, wherein a given one of the data protection ecosystems is operatively coupled to a given one of the plurality of nodes of the distributed ledger system;
   managing one or more data sets processed by the one or more data protection ecosystems in association with the distributed ledger system, wherein managing comprises storing transaction data associated with the processing of the one or more data sets on the distributed ledger system; and
   enabling a multi-cloud environment-wide view of the stored transaction data representing processing activities of the one or more data sets across the two or more cloud platforms;
   wherein the one or more data protection ecosystems comprise first and second data protection ecosystems respectively associated with first and second cloud platforms;
   wherein the first data protection ecosystem is operatively coupled to a first node of the distributed ledger system and wherein the second data protection ecosystem is operatively coupled to a second node of the distributed ledger system;
   wherein managing the one or more data sets comprises at least the first and second nodes of the distributed ledger system accessing the stored transaction data;
   wherein the first node is a local blockchain node for the first cloud platform and the second node is a local blockchain node for the second cloud platform;
   wherein the first node is configured to receive event data associated with the processing of one or more data sets by the first data protection ecosystem and to convert the event data into transaction data for storage in the first node;

wherein the second node is configured to receive event data associated with the processing of one or more data sets by the second data protection ecosystem and to convert the event data into transaction data for storage in the second node;

wherein managing the one or more data sets comprises at least one of the first node accessing the stored transaction data of the second node and the second node accessing the stored transaction data of the first node; and wherein the method is implemented via one or more processing devices each comprising a processor coupled to a memory.

2. The method of claim 1, wherein the one or more cloud platforms comprise at least one of one or more private cloud platforms and one or more public cloud platforms.

3. The method of claim 1, wherein the transaction data comprises at least one of metadata about one or more copied data sets, metadata about one or more restored data sets, and metadata about one or more deleted data sets.

4. The method of claim 1, wherein the given one of the data protection ecosystems is operatively coupled to the given one of the plurality of nodes of the distributed ledger system via a local portal.

5. The method of claim 4, wherein the local portal comprises logic configured to convert event data associated with the processing of one or more data sets by the given data protection ecosystem into transaction data for storage in the given node of the distributed ledger system.

6. The method of claim 5, wherein the logic comprises a smart contract.

7. The method of claim 5, wherein the local portal is configured to send the transaction data to other nodes of the distributed ledger system.

8. The method of claim 4, wherein the local portal is configured to send the event data to other nodes of the distributed ledger system.

9. The method of claim 1, wherein enabling the multi-cloud environment-wide view includes coupling a dashboard to the distributed ledger system, the dashboard configured to present the multi-cloud environment-wide view of the stored transaction data.

10. The method of claim 9, wherein the dashboard is configured to provide a view of transaction data representing at least one of a data set creation event, a data set copy event, and a data set deletion event.

11. The method of claim 10, wherein the dashboard is configured to provide a search feature to locate one or more of the data set creation event, the data set copy event, and the data set deletion event.

12. The method of claim 9, wherein:
the dashboard is configured to initiate an operation on the one or more data sets associated with the one or more cloud platforms; and
wherein the operation comprises one or more of a delete operation and a move operation.

13. The method of claim 9, wherein the dashboard is implemented on at least one of the first and second nodes.

14. The method of claim 1, wherein:
the given one of the data protection ecosystems sends the transaction data associated with the one or more data sets processed thereby to the distributed ledger system for storage.

15. An article of manufacture comprising a non-transitory processor-readable storage medium having stored therein program code of one or more software programs, wherein the program code when executed by at least one processing device causes said at least one processing device to perform the steps of:

in a multi-cloud computing environment associated with an enterprise comprising two or more cloud platforms with one or more respective data protection ecosystems, maintaining a distributed ledger system comprising a plurality of nodes operatively coupled in a peer-to-peer communications protocol, wherein a given one of the data protection ecosystems is operatively coupled to a given one of the plurality of nodes of the distributed ledger system;

managing one or more data sets processed by the one or more data protection ecosystems in association with the distributed ledger system, wherein managing comprises storing transaction data associated with the processing of the one or more data sets on the distributed ledger system; and enabling a multi-cloud environment-wide view of the stored transaction data representing processing activities of the one or more data sets across the two or more cloud platforms;

wherein the one or more data protection ecosystems comprise first and second data protection ecosystems respectively associated with first and second cloud platforms;

wherein the first data protection ecosystem is operatively coupled to a first node of the distributed ledger system and wherein the second data protection ecosystem is operatively coupled to a second node of the distributed ledger system;

wherein managing the one or more data sets comprises at least the first and second nodes of the distributed ledger system accessing the stored transaction data;

wherein the first node is a local blockchain node for the first cloud platform and the second node is a local blockchain node for the second cloud platform;

wherein the first node is configured to receive event data associated with the processing of one or more data sets by the first data protection ecosystem and to convert the event data into transaction data for storage in the first node;

wherein the second node is configured to receive event data associated with the processing of one or more data sets by the second data protection ecosystem and to convert the event data into transaction data for storage in the second node;

wherein managing the one or more data sets comprises at least one of the first node accessing the stored transaction data of the second node and the second node accessing the stored transaction data of the first node.

16. A system comprising:
one or more processing devices including a processor coupled to memory and configured to:
in a multi-cloud computing environment associated with an enterprise comprising two or more cloud platforms with one or more respective data protection ecosystems, maintain a distributed ledger system comprising a plurality of nodes operatively coupled in a peer-to-peer communications protocol, wherein a given one of the data protection ecosystems is operatively coupled to a given one of the plurality of nodes of the distributed ledger system;

manage one or more data sets processed by the one or more data protection ecosystems in association with the distributed ledger system, wherein managing comprises storing transaction data associated with the processing of the one or more data sets on the distributed ledger system; and enable a multi-cloud environment-wide view of the stored transaction data representing processing activities of the one or more data sets across the two or more cloud platforms;

wherein the one or more data protection ecosystems comprise first and second data protection ecosystems respectively associated with first and second cloud platforms;

wherein the first data protection ecosystem is operatively coupled to a first node of the distributed ledger system and wherein the second data protection ecosystem is operatively coupled to a second node of the distributed ledger system;

wherein managing the one or more data sets comprises at least the first and second nodes of the distributed ledger system accessing the stored transaction data;

wherein the first node is a local blockchain node for the first cloud platform and the second node is a local blockchain node for the second cloud platform;

wherein the first node is configured to receive event data associated with the processing of one or more data sets by the first data protection ecosystem and to convert the event data into transaction data for storage in the first node;

wherein the second node is configured to receive event data associated with the processing of one or more data sets by the second data protection ecosystem and to convert the event data into transaction data for storage in the second node; and wherein managing the one or more data sets comprises at least one of the first node accessing the stored transaction data of the second node and the second node accessing the stored transaction data of the first node.

17. The system of claim 16, wherein the one or more cloud platforms comprise at least one of one or more private cloud platforms and one or more public cloud platforms.

18. The system of claim 16, wherein the transaction data comprises at least one of metadata about one or more copied data sets, metadata about one or more restored data sets, and metadata about one or more deleted data sets.

19. The system of claim 16, wherein the distributed ledger system comprises a dashboard configured to present the environment-wide view of the stored transaction data.

20. The system of claim 19, wherein the dashboard is implemented on at least one of the first and second nodes.

* * * * *